US007493475B2

(12) United States Patent
Colavin

(10) Patent No.: US 7,493,475 B2
(45) Date of Patent: Feb. 17, 2009

(54) INSTRUCTION VECTOR-MODE PROCESSING IN MULTI-LANE PROCESSOR BY MULTIPLEX SWITCH REPLICATING INSTRUCTION IN ONE LANE TO SELECT OTHERS ALONG WITH UPDATED OPERAND ADDRESS

(75) Inventor: Osvaldo M. Colavin, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 146 days.

(21) Appl. No.: 11/602,277

(22) Filed: Nov. 15, 2006

(65) Prior Publication Data

US 2008/0114970 A1    May 15, 2008

(51) Int. Cl.
*G06F 9/30* (2006.01)
(52) U.S. Cl. .......................... 712/214; 712/16
(58) Field of Classification Search ........................ None
See application file for complete search history.

(56) References Cited

U.S. PATENT DOCUMENTS

| 5,537,606 | A | 7/1996 | Byrne | |
|---|---|---|---|---|
| 6,272,616 | B1* | 8/2001 | Fernando et al. | 712/20 |
| 2005/0125640 | A1 | 6/2005 | Ford et al. | |
| 2005/0216700 | A1* | 9/2005 | Honary et al. | 712/15 |
| 2006/0248320 | A1* | 11/2006 | Chin et al. | 712/241 |

FOREIGN PATENT DOCUMENTS

| WO | WO99/31601 | | 6/1999 |
|---|---|---|---|
| WO | WO03/096184 | A2 | 11/2003 |
| WO | WO2006/058358 | A2 | 6/2006 |

OTHER PUBLICATIONS

Jouppi et al., "A Unified Vector/Scalar Floating-Point Architecture," Digital, Western Research Laboratory, Research Report 89/8, Jul. 1989, pp. i-v, 1-23.
European Search Report from corresponding EP Application No. 07254379.6.

* cited by examiner

*Primary Examiner*—Kenneth S Kim
(74) *Attorney, Agent, or Firm*—Lisa K. Jorgenson; James H. Morris

(57) ABSTRACT

An improved superscalar processor. The processor includes multiple lanes, allowing multiple instructions in a bundle to be executed in parallel. In vector mode, the parallel lanes may be used to execute multiple instances of a bundle, representing multiple iterations of the bundle in a vector run. Scheduling logic determines whether, for each bundle, multiple instances can be executed in parallel. If multiple instances can be executed in parallel, coupling circuitry couples an instance of the bundle from one lane into one or more other lanes. In each lane, register addresses are renamed to ensure proper execution of the bundles in the vector run. Additionally, the processor may include a register bank separate from the architectural register file. Renaming logic can generate addresses to this separate register bank that are longer than used to address architectural registers, allowing longer vectors and more efficient processor operation.

13 Claims, 10 Drawing Sheets

```
area = 0; total = 0;
for (x=-mask_size; x<=mask_size; x++) {
    brightness = *ip++;
    tmp = *dpt++ * (cp - brightness);
    area += tmp;
    total += tmp * brightness;
}
```

```
1   IncomingBundle = list of instructions from issue stage
    # First determine ReplicateCount, the number of times IncomingBundle can be issued in a
    single cycle
    # ReplicateCount is limited by the IssueWidth of the processor
2   ReplicateCount = ProcessorIssueWidth/|IncomingBundle|
    # Each instruction in IncomingBundle can further constrain ReplicateCount: when there is
    a structural limitation for this instruction's type (e.g. a single memory operation can be
    issued per cycle)
3   foreach instType in IncomingBundle
4     r = resourceCount(instType)/instCount(IncomingBundle,instType)
5     ReplicateCount = min(ReplicateCount,r)
    # Duplicate and rename IncomingBundle, check for data dependences, until VL is reached
6   VC = 0
7   IssueCount = VL
8   repeat
9     OutgoingBundle = () # empty list
10    N = min(IssueCount,ReplicateCount)
11    for (i=1 to N)
12      OutgoingBundle += rename(IncomingBundle,i)
    # Check for data dependences, roll back replication if one is found; this is done here
    because some data dependences will appear only after replication and renaming
13    foreach inst in OutgoingBundle
14      if (dst(inst) ∈ src(OutgoingBundle))
15        OutgoingBundle = IncomingBundle
16        N = 1
17    VC = VC + N
18    IssueCount = IssueCount -N
19    issue(OutgoingBundle)
20    next_cycle()
21  until IssueCount==0
22  goto line 1
```

FIG. 8

INSTRUCTION VECTOR-MODE PROCESSING IN MULTI-LANE PROCESSOR BY MULTIPLEX SWITCH REPLICATING INSTRUCTION IN ONE LANE TO SELECT OTHERS ALONG WITH UPDATED OPERAND ADDRESS

BACKGROUND OF INVENTION

1. Field of Invention

This invention relates generally to processors and more specifically to high performance and low power processors.

2. Discussion of Related Art

Processors are well known and widely used in many applications. Because processors execute instructions that can be combined into an unlimited number of combinations and sequences, they can be programmed for almost any application. Even though such programmability makes processors very flexible, there are nonetheless many kinds of processors available.

High end processors are used in supercomputers and other computationally intensive applications. Some such processors employ vector architectures. A vector architecture allows the processor to fetch an instruction once and then execute multiple iterations of the instruction with different data in each iteration. In applications with relatively large vectorizable loops, a vector architecture reduces the total time and the energy required to execute a program because each instruction needs to be fetched fewer times per loop. A vector processor always includes a scalar processor to execute the parts of a program that are not vectorizable.

Some processors employ a multi-issue architecture. A multi-issue architecture contains multiple paths, each of which can execute an instruction. As the prosecutor executes a program, it groups instructions into "bundles," and applies each instruction in the bundle to one of the paths so that the instructions of the bundle execute concurrently. Concurrent execution increases the rate at which a program executes.

Various approaches are used to form bundles. In statically scheduled multi-issue processors, a compiler groups instructions into bundles as part of generating a program for the processor. In dynamically scheduled processors, hardware within the processor groups instructions into bundles as the program executes. Regardless of how the bundles are formed, a mechanism is used to avoid conflicts that can occur when multiple instructions are executed concurrently. Conflicts could be created, for example, if multiple instructions in a bundle simultaneously need to access the same hardware resource in the processor or if one instruction in the bundle requires as an input a value that is output when another instruction in the bundle executes. For statically scheduled processors, the compiler recognizes potential conflicts and defines the bundles so that conflicting instructions do not appear in the same bundle. In a dynamically scheduled processor, the processor contains scheduling logic that groups instructions into bundles only if the instructions do not conflict.

Even relatively small electronic devices, such as hand held electronic devices, employ processors. Processors used in small electronic devices tend to have a statically scheduled scalar architecture, which could be a single-issue or multi-issue architecture. A processor with a scalar architecture fetches an instruction and data for the instruction each time the instruction is executed. In executing a loop that requires an instruction to be executed multiple times, a processor with a scalar architecture will fetch the instruction multiple times. Consequently, processors with scalar architectures tend to execute programs that include vectorizable loops more slowly and dissipate more energy doing so than those with vector architectures. However, they tend to occupy a smaller area on a silicon die, which can be a significant advantage in making a small or low cost processor for an embedded application.

Some scalar processors have been adapted to execute multiple operations for one fetch of an instruction. However, these processors have required that instructions encoding the multiple operations be encoded in one instruction word. Such architectures proved difficult in practice to use. The instruction set for the processor needed to be expanded to accommodate many new instructions encoding multiple operations. In addition, making a complier that could identify patterns of instructions in a program that could be mapped to an instruction encoding multiple operations proved difficult.

A related concept is called "software pipelining." By overlapping the execution of successive iterations of a loop, the order of instructions processed is selected to reduce the total execution time of a block of code.

Some processors employ a "rotating register file." A rotating register file provides a series of register locations that can be readily accessed by a processor. Successive reads or writes to the same address in the register file result in access of successive locations in the file. When the last location is reached, the succession "rotates" back to the first location. A rotating register file may be used during software pipelining to reduce code size.

Notwithstanding the many types of processors available, it would be desirable to provide an improved processor architecture.

SUMMARY OF INVENTION

In one aspect, the invention relates to a method of operating a processor to execute a plurality of instances of an instruction. The processor has a plurality of lanes for parallel execution of instructions. The instruction is supplied in a first lane and the processor dynamically determines a number of instances of the instruction to be executed in parallel. The opcode of the instruction is replicated in at least one second lane of the plurality of lanes such that multiple instances of the instruction are executed in parallel.

In another aspect, the invention relates to a processor adapted to execute a plurality of instances of an instruction. The processor comprises a plurality of lanes, each of which can execute an instruction. Coupling circuitry couples at least one incoming lane to at least one coupled lane in response to a control signal. The coupling circuitry comprises at least one opcode switching element connected between the incoming lane and the coupled lane. The opcode switching element couples the opcode of an instruction in the incoming lane to the coupled lane. The coupling circuitry also comprises at least one argument switching element. Each argument switching element is connected between the incoming lane and the coupled lane and can modify arguments of an instruction in the incoming lane and couples the modified argument to the coupled lane. The processor also includes control circuitry adapted to control the opcode switching element and the argument switching element.

In another aspect, the invention relates to a processor selectively operable in vector mode. The processor comprises a first register bank comprising a first plurality of registers; a second register bank comprising a second plurality of registers; and at least one instruction lane adapted to execute an instruction comprising at least one argument specified as a register address. The at least one instruction lane comprises at least one register access circuit adapted to access a register in the first register bank in response to the argument when the processor is operating in vector mode and to access a register in the second register bank in response to the argument when the processor is not operating in vector mode.

In another aspect, the invention relates to a method of selectively operating a processor in vector mode. The processor has a first register bank and a second register bank. When in vector mode, a plurality of instances of the instruction are executed. For each instance, a different address is computed from the argument and the instance is executed using a register in the first register bank at the computed address. When not in vector mode, the instruction is executed using a register in the second register bank identified by the argument.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 8 is a pseudo code representation of the operation of scheduling and control logic according to an embodiment of the invention;

DETAILED DESCRIPTION

An improved processor may be constructed by providing multiple paths in which multiple instances of an instruction may be executed. Such a processor may have both a vector mode and a scalar mode of operation. In scalar mode, the parallel paths may be used as in a conventional multi-issue processor. In vector mode, the parallel paths may execute multiple iterations of an instruction in a vector run. To enable changes between modes, the processor may be constructed to respond to one or more instructions that change the operating mode.

Such a processor also may include scheduling logic that determines the number of iterations of an instruction that can be executed in parallel in vector mode, taking into account the number of iterations remaining in a vector run, the number of instructions in a bundle, conflicts between instructions, limitations on the processor hardware or other factors. Switching logic may replicate the instruction in the determined number paths. To ensure that each instance of an instruction operates on the proper arguments, the switching logic may incorporate renaming logic that ensures that each instance of the instruction operates on the proper arguments. For an instruction that is part of a bundle, all instructions in the bundle may be replicated and executed in parallel.

An improved processor also may be constructed by increasing the number of registers in a register file available for use in vector mode. A larger register file may be used in any processor with vector mode operation, but may be particularly useful in multi-issue processors.

In some embodiments, a separate bank of vector registers may be used for vector registers. Renaming logic may generate addresses to the vector register bank and may therefore output addresses with more bits than are used in an instruction to represent an argument of the instruction. By using renaming logic with more output bits than are used to indicate a vector register address in an instruction, the vector register file can be made arbitrarily large, without being constrained by the number of bits available in an instruction to hold a register address, and may be larger than the architectural register file of the processor.

As a result, programs for the processor may occupy less space in computer memory, execute more quickly and/or will consume less power when executed.

Figures 1A, 1B:
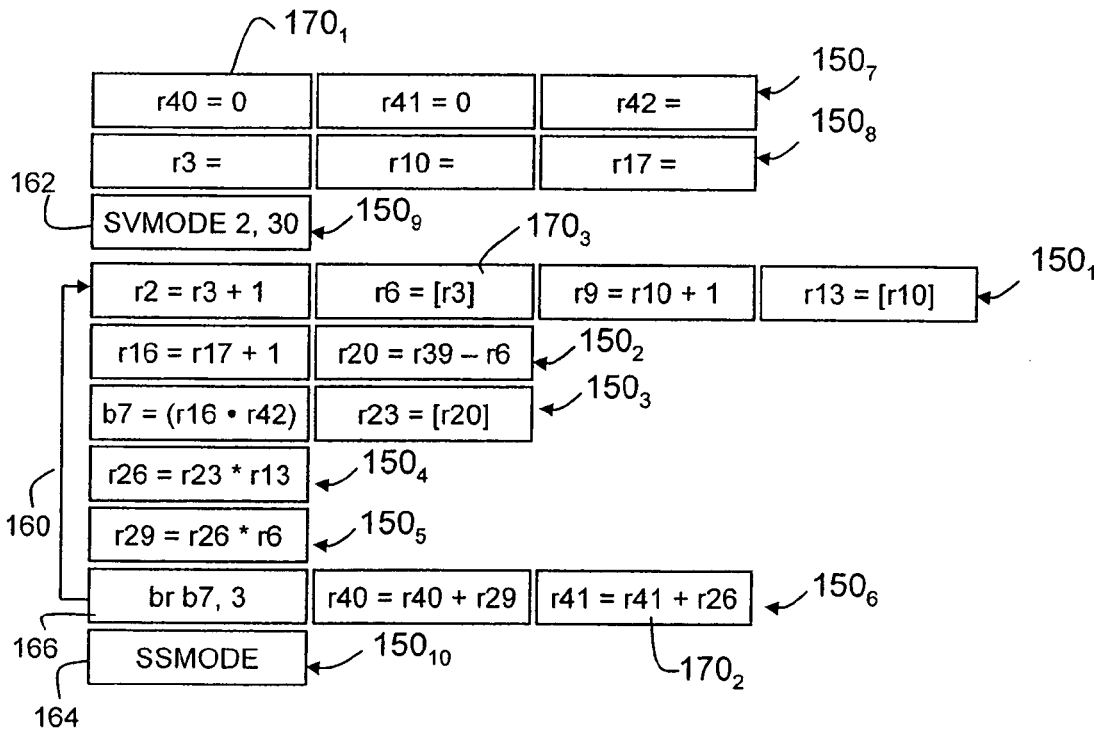
FIG. 1A illustrates an exemplary program with a vectorizable loop used to illustrate operation of a processor according to an embodiment of the invention.
FIG. 1B is a sketch illustrating assembly instructions encoding the program of FIG. 1A.

FIG. 1A illustrates a portion of a computer program containing a vectorizable loop that can be executed by a processor according to an embodiment of the invention. FIG. 1 shows as an example a program 100 from a popular benchmark, the susan image processing program from the MiBench set. Program 100 includes a loop 110 that may be vectorized so that instructions executed in multiple iterations of the loop are executed as part of a vector run without the need to fetch the instruction for each iteration.

A processor that can execute a vectorized program is described in U.S. patent application Ser. No. 11/013,122, entitled "METHOD AND APPARATUS FOR VECTOR EXECUTION ON A SCALAR MACHINE," by Osvaldo Colavin, filed on Dec. 15, 2004, which is hereby incorporated by reference. A processor according to an embodiment of the invention may employ design principles discussed in that application. However, a processor as described herein may have a multi-issue architecture and may include logic to facilitate parallel execution of instructions forming separate iterations of instructions in a vector run.

In the example of FIG. 1A, program 100 contains instructions in the C programming language. The C programming language is an example of a high level programming language. Each instruction in a high level language may translate into one or more machine instructions that a processor can execute. Development tools, such as compilers, convert the instructions in the high level language into low level instructions. In doing so, the compiler selects registers used to hold arguments of the instructions and otherwise selects physical resources of a processor to execute the instructions.

Compilers that convert high level instructions into machine instructions are known in the art. A compiler to produce machine instructions for execution by a processor according to an embodiment of the invention may be constructed using known compiler technology. As one example, a compiler as is conventionally used to statically generate bundles of machine instructions for a multi-issue processor may be used. Such bundles of instructions may be dynamically scheduled to take advantage of features of a processor according to an embodiment of the invention.

However, the invention is not limited to use in connection with a compiler that statically schedules instructions in bundles. A processor according to an embodiment of the invention may dynamically create bundles of instructions and then selectively schedule those bundles for execution.

Regardless of how machine instructions are generated, each machine instruction is made up of multiple bits, which may be grouped into one or more fields. One of the fields is called an "opcode" and defines the operation that the processor performs when the instruction is executed. For example, an instruction set for a processor may include instructions with opcodes that cause a processor to perform arithmetic functions such as addition, subtraction, multiplication and division. Instructions with other opcodes can cause a processor to perform data processing functions, such as moving data or comparing two values. Different processors will have instruction sets with different numbers and types of opcodes. Accordingly, the specific opcodes in the instruction set is not a limitation on the invention.

Other fields in a machine instruction may specify arguments for the operation performed when the instruction is executed. The arguments may specify one or more sources and/or destinations for data. For arithmetic operations, the arguments may identify the operands used when the operation is performed and a destination for results computed during the operation. In the example herein, each instruction includes fields for two source arguments and one destination argument.

The arguments may be specified in any suitable way. Many processors employ addressing modes in which the treatment of a value in an argument field is based on the addressing mode. In some modes, called immediate modes, the bits of the argument field represent a numeric value that is the operand. In other modes, called direct modes, the bits of the argument field represent the address of a register of the processor from which the value of the operand can be derived. Any of these addressing modes, and any other suitable addressing modes may be supported by a processor according to an embodiment of the invention.

As an aid to human understanding of programs, machine instructions are sometimes represented as assembly instructions. Each assembly instruction symbolically represents the fields of the machine instruction. Typically, an assembly instruction includes a human recognizable mnemonic identifying the operation performed when the instruction is executed. The arguments to that instruction are also depicted in a form recognizable to a human. In the examples herein, machine instructions are represented in an assembly language, but such representation is for simplicity. The actual machine instructions executed by a processor may be formed as a series of bits or in any other suitable way.

FIG. 1B illustrates pseudo-instructions in assembly that may be generated by a compiler operating on program 100 (FIG. 1A). For example, instruction $170_1$ represents a machine instruction that performs a move operation. The destination of the operation is a register, identified by its address, r40. An operand for this instruction is the value 0, which may be represented as a digital value in a source field of the machine instruction.

Instruction $170_2$ similarly represents a machine instruction, in this case an addition operation. In instruction $170_2$, operands are obtained from registers at addresses r26 and r41. The destination for the result is a register at address r41.

As demonstrated by FIG. 1B, a processor according to an embodiment of the invention may perform instructions that operate in one or more addressing modes. For example, instruction $170_1$ provides an example of an immediate addressing mode in which a source, in this example 0, is stored in a field of the instruction. Instruction $170_2$ provides an example of a direct addressing mode in which values for the operands are read from a register that is identified in a field of the instruction. In instruction $170_2$, the values in registers at addresses r41 and r26 are used in performing an operation. Instruction $170_3$ provides an example of an indirect addressing mode. In an indirect addressing mode, a register is identified in a field of the instruction. Upon execution of the instruction, the value stored in that register is used as an address to identify another storage location where the value used for the operation is stored.

In the examples that follow, instructions using addressing modes involving register addresses are described. Such instructions may require processing to "rename" the register addresses for vector mode operation. However, a processor according an embodiment of the invention may operate on instructions with other addressing modes, whether now known or hereafter developed. Instructions with other addressing modes may be processed as in a conventional processor or any other suitable way. Accordingly, the specific addressing modes supported by a processor is not a limitation on the invention.

In the example of FIG. 1B, the processor is a multi-issue processor with an issue width of four. Such a processor has four parallel paths that can each execute an instruction, allowing the processor to issue bundles of instructions containing up to four instructions. However, a processor may be constructed with any suitable number of paths.

FIG. 1B shows bundles $150_1 \ldots 150_{10}$. In this example, each bundle contains between one and four instructions. The number of instructions in each bundle may be selected to avoid conflicts that prevent two instructions in a bundle from being executed in one instruction cycle. A conflict may arise because of a structural limitation of a processor does not have enough copies of a hardware element to execute all of the instructions in a bundle simultaneously.

As an example of a structural limitation, processor hardware that accesses memory and executes multiply operations may be limited and the processor may not be able to issue more than two memory instructions (e.g., load or store), or more than two multiply instructions in one cycle. As another example, the processor hardware may be limited to executing one branch instruction per cycle.

A conflict may also arise because of a data dependency that precludes an instruction from executing because a source argument for that instruction is generated as the destination argument of another instruction that has not been executed. In some instances, latency may also limit the number of instructions in a bundle. An instruction may not be part of an issued bundle if it is dependent on an uncompleted long latency instruction part of a previously issued bundle. In this example, the latency of memory read and multiply operations is two cycles. Such instructions may be pipelined, meaning that one memory or multiply instruction can be issued every cycle.

Regardless of the reasons why instructions create a conflict, a compiler, dynamic scheduler or other device may limit the number of instructions included in a bundle to avoid conflicts. For example, bundle $150_4$ is shown to include four instructions, but bundle $150_8$ contains only one instruction.

The bundles of instructions shown in FIG. 1B contain instructions that perform program 100. Bundles $150_7$ and $150_8$ include instructions that initialize registers that will be used during the execution of loop 110.

Bundle $150_9$ contains a single instruction, SVMODE instruction 162, which sets the processor in vector mode. The instructions following an SVMODE instruction 162 will be executed in vector mode until SSMODE instruction 164 is executed. As described in more detail below, when the processor is in vector mode, multiple iterations of each instruction may be executed in vector runs.

The first immediate argument of SVMODE instruction 162 is shown with a value of two. This argument indicates the length of the vector and defines the number of iterations of each instruction performed in a vector run. In a processor according to an embodiment of the invention, the vector length is stored in an architectural register, VL register 750 (FIG. 7), when SVMODE instruction 162 is executed.

The second immediate argument to SVMODE instruction 162 may define vector registers. Even when instructions are executed in vector mode, not all register arguments are intended to be renamed. For example, an argument of an instruction may identify a register holding a value that is to be used for all iterations of the instruction. In this scenario, if the register address is indexed between iterations, an incorrect result may be obtained. Accordingly, a mechanism is required to distinguish between vector registers, which are renamed in vector mode, and scalar registers, which are not renamed. In this example, SVMODE instruction 162 specifies vector and scalar registers, but any suitable mechanism may be used.

In this example, the second immediate operand of SVMODE instruction 162 sets an upper bound on a portion of a register file used for vector mode registers. The value of 30 indicates that registers 0 to 29 will be used as vector registers. When in vector mode, any register address between 0 and 29 will be "renamed" during a vector run. In a processor according to an embodiment of the invention, the upper bound on the registers used as vector registers is stored in an architectural register, RUB register 701 (FIG. 7), when SVMODE instruction 162 is executed.

In vector mode, a register is "renamed" by changing the address of that register between iterations of an instruction in a vector run so that each iteration accesses a different physical register. In the example embodiment described herein, each vector register used as an argument to an instruction is indexed for each iteration of the instruction in a vector run. Indexing of vector register addresses allows each iteration of the instruction to operate on different data. For example, the first iteration of an instruction may store a result in a register at address r5. The next iteration of that instruction may store a result in register at address r4. Subsequent iterations may store results in registers with successively lower addresses to ensure that the results of all iterations are available for use in executing other instructions.

Bundles $150_1$ through $150_6$ contain instructions in loop 160 that perform the processing in the body of loop 110 (FIG. 1A). Bundle $150_6$ includes a special conditional branch instruction 166 that branches to the beginning of loop 160, depending of the value held in branch register b7. The target operand of the branch is not shown for simplicity, and any suitable method for indicating a target may be used. The second operand of the branch instruction is an immediate argument, having a value of three in this example, and is used to set the VL register 750 (FIG. 7) when the branch is taken.

Thus, in the first vector run that occurs in the first pass through the instructions in loop 160, each of the bundles $150_1$ through $150_6$ will be executed in a vector run with a vector length of two, as set by SVMODE instruction 162. Accordingly, each of the bundles will be executed twice when it is fetched. In subsequent vector runs that occur in subsequent passes through loop 160, each of the bundles $150_1$ through $150_6$ will be executed with a vector length of three, as set by the branch instruction 166. Accordingly, each of the bundles will be executed three times when it is fetched.

Because the vector length can be changed during execution of a loop, any number of iterations of the instructions in the loop can be efficiently executed. Processors without the ability to change the vector length during a loop are constrained to execute a vector loop with a number of iterations that is an integer multiple of the vector length. Such processors may be limited to using shorter, and therefore less efficient, vector lengths. Alternatively or additionally, such processors may be required to "peel" a few iterations of the loop and execute them in scalar mode or in a separate vector loop when the number of iterations of the loop is a not a multiple of the vector length. A mechanism to dynamically change the vector length can result in a more compact program and more efficient execution.

Following execution of a vector loop, the processor may be reset to scalar mode operation. Bundle $150_{10}$ contains SSMODE instruction 164 that resets the processor in scalar mode. Though not shown, subsequent instructions may be executed as in a conventional multi-issue processor or may be executed as further vector loops.

Figure 2:
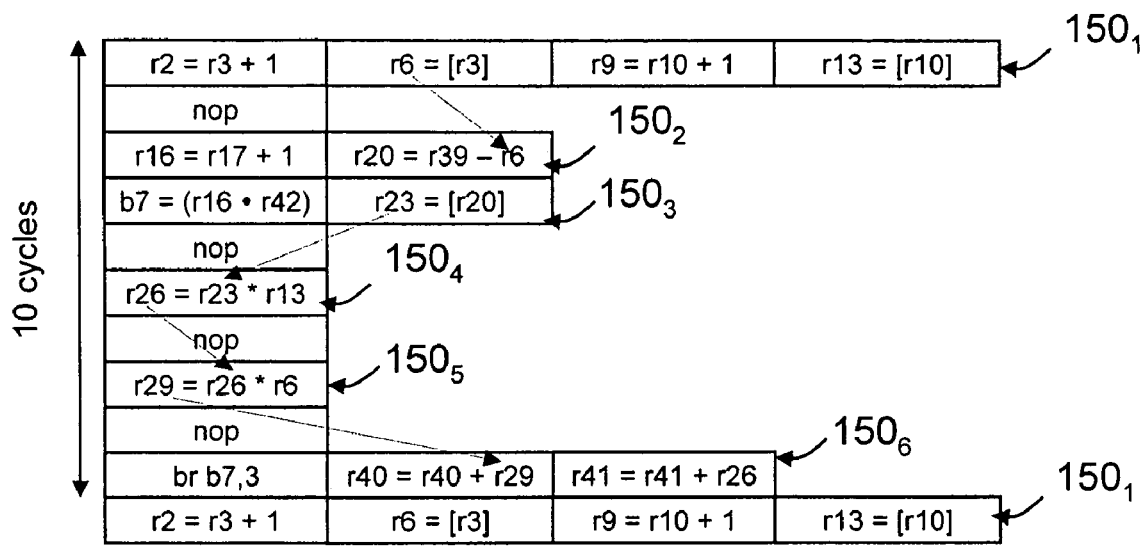
FIG. 2 shows a trace of scalar mode execution of one iteration of a loop in the program of FIG. 1A.
Figure 3:
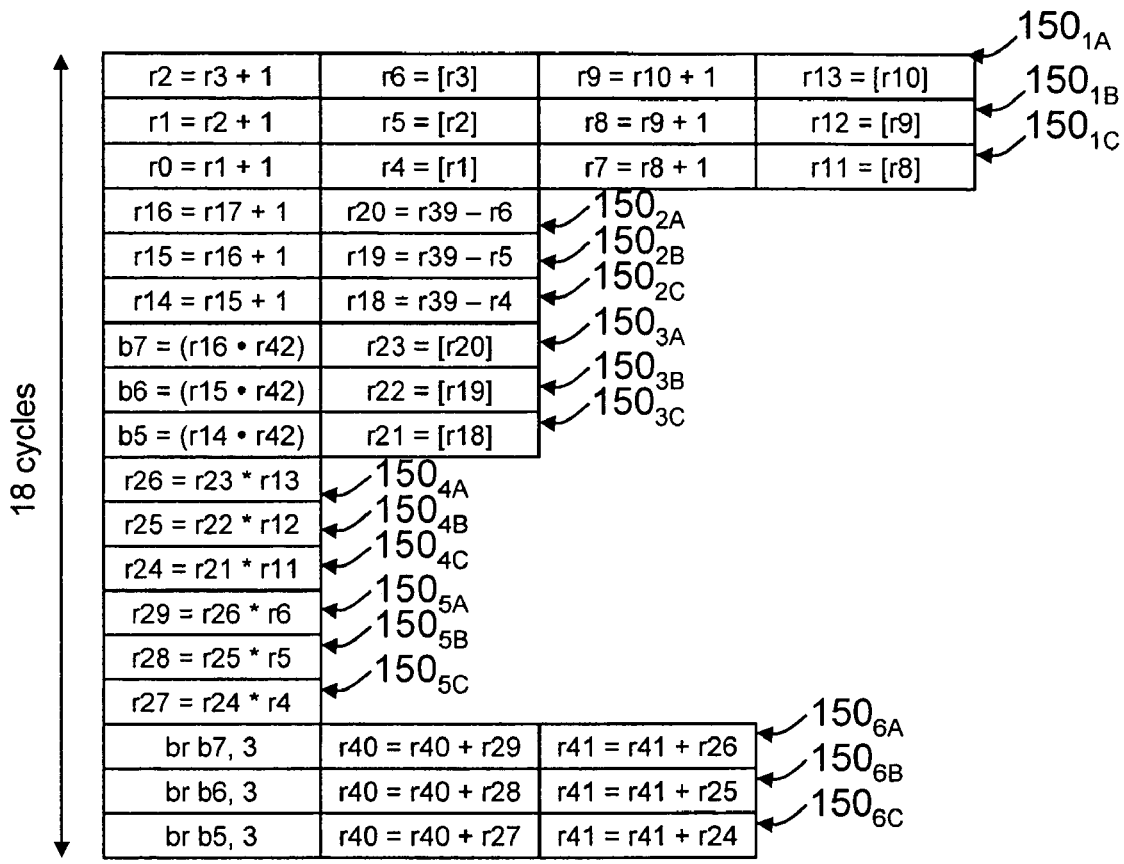
FIG. 3 shows a trace of vector mode execution of three iterations of the loop in the program of FIG. 1A.
Figure 4:
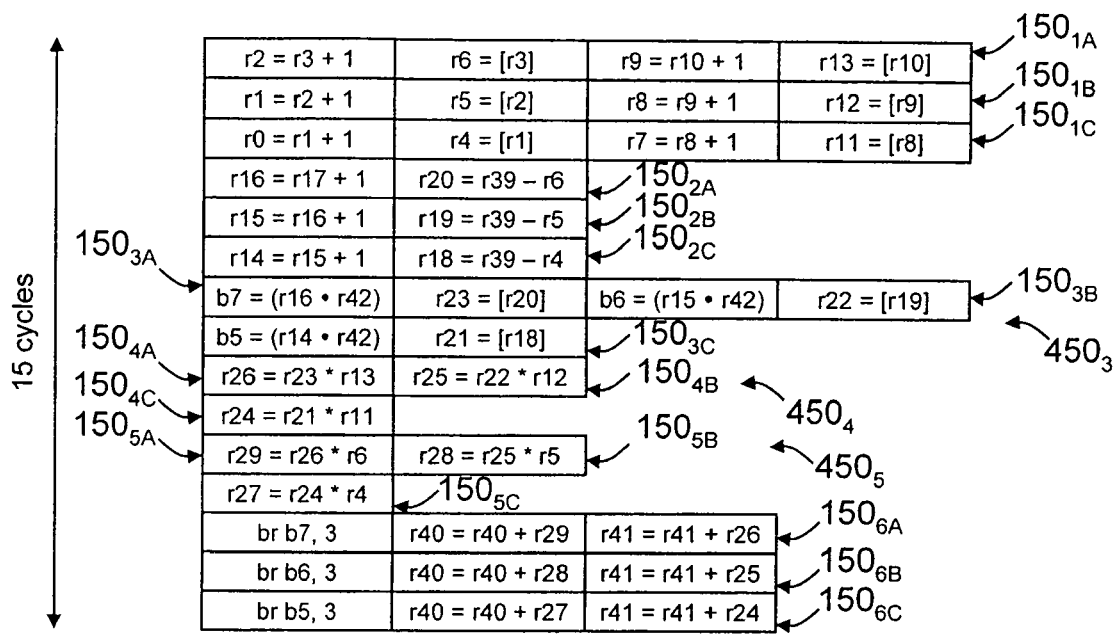
FIG. 4 shows a trace of vector mode execution of three iterations of the loop in the program of FIG. 1A in a processor using a scheduling method according to an embodiment of this invention.

An example of an improvement that can be achieved with a processor according to an embodiment of the invention can be seen from a comparison of FIGS. 2, 3 and 4. FIG. 2 shows a trace of scalar mode execution of one iteration of loop 160 (FIG. 1B). Because memory and multiply instructions have two-cycle latency in the example embodiment, stall cycles (or nops) appear between bundles $150_1$ and $150_2$, $150_3$ and $150_4$, $150_4$ and $150_5$, and $150_5$ and $150_6$ because of data dependencies between these instructions. The data dependencies are highlighted by arrows indicating an argument modified in one instruction that is used as an input in a subsequent instruction.

The total execution time for one iteration of loop 160 (FIG. 1B), assuming no instruction cache or data cache misses or branch mis-predictions, is 10 instruction cycles. Because there are 13 instructions in the loop body, the average instruction level parallelism (or ILP) is 1.3 instructions/cycle. In scalar mode, additional iterations of the instructions in the loop body are executed by repeating the same operations and the average ILP will be 1.3, regardless of the number of iterations performed.

In contrast, FIG. 3 is a trace of the vector mode execution of three iterations of loop 160 (FIG. 1B) with the same assumptions as in FIG. 2 (i.e., no cache misses or branch mis-predictions). Each bundle is issued and executed three times consecutively in a vector run of length three. For example, FIG. 3 shows a vector run with bundles $150_{1A}$, $150_{1B}$ and $150_{1C}$, representing three successive iterations of bundle $150_1$.

In each successive iteration within a vector run, vector registers are renamed. In this example, each vector register is renamed by decreasing the register address by one. Accordingly, bundle $150_{1A}$ includes an instruction r2=r3+1, but bundle $150_{1B}$ includes a corresponding instruction of r1=r2+1 with "renamed" register addresses.

Scalar register addresses are not renamed between successive iterations of a bundle. For example, bundle $150_{2A}$ includes an instruction r20=r39−r6. Because registers with addresses less than 30 are vector registers, register addresses r20 and r6 are renamed in the next iteration, but register address r39 is not. Accordingly, bundle $150_{2B}$ includes an instruction r19=r39−r5. A compiler forming instructions for a processor operating in vector mode as illustrated in FIG. 3 may assign vector and scalar registers appropriately to ensure that arguments intended to have the same value in each iteration of an instruction are assigned to a scalar register while those arguments that may have different values are assigned to vector registers. However, any suitable method for distinguishing between vector and scalar registers may be used.

The stall cycles introduced by long-latency operators shown in FIG. 2 are hidden by the vector mode of operation, and the average ILP becomes 39 instructions executed over 18 cycles, or 2.17 instructions/cycle. In this example, executing loop 160 (FIG. 1B) in vector mode provides an improvement of 67% over execution in scalar mode.

FIG. 4 illustrates a further improvement that can be achieved by, when possible, issuing bundles of instructions in a vector run in parallel. FIG. 4 shows a trace of vector execution of three iterations of loop 160 (FIG. 1B) with the same assumptions as in FIGS. 2 and 3. However, the trace of FIG. 4 is formed by execution in a processor that can issue multiple iterations of instructions in a vector run as parallel instances of the same instructions.

FIG. 4 shows bundles $450_3$, $450_4$ and $450_5$ that have been formed by parallel issue of multiple instances of bundles that, in the embodiment of FIG. 3, are issued sequentially. In this example, bundle $450_3$ is formed by the parallel issue of bundles $150_{3A}$ and $150_{3B}$, which represent two instances of bundle $150_3$. Bundle $450_4$ is formed by the parallel issue of bundles $150_{4A}$ and $150_{4B}$, which represent two instances of bundle $150_4$. Bundle $450_5$ is formed by the parallel issue of bundles $150_{5A}$ and $150_{5B}$, which represent two instances of bundle $150_5$. As a result of parallel issue of bundles, three iterations of loop 110 are executed in 15 cycles, compared to 18 in the embodiment of FIG. 3, leading to an average ILP of 39/15=2.6 instructions/cycle. In this example, parallel issuance of bundles in a vector run results in an additional 20% improvement over vector mode execution depicted in FIG. 3 and a total 100% improvement over scalar mode execution depicted in FIG. 2.

In the embodiment of FIG. 4, the instances of the bundles issued in parallel have vector register addresses indexed in the same manner as when issued sequentially in FIG. 3. For example, bundle $450_3$ includes bundles $150_{3A}$ and $150_{3B}$ containing an instruction in which a value is computed by comparing two operands. One of the operands is a scalar value, stored in register r42, which may be used as the source of the operand for both instances.

The second operand is stored in a vector register and therefore may have a different value from one iteration to the next. In constructing bundle $450_3$ by parallel issuance of bundle $150_3$ (FIG. 1B), the vector registers used in forming bundles $150_{3A}$ and $150_{3B}$ are indexed to achieve the same result as sequential execution of those bundles in vector mode.

A processor according to an embodiment of the invention may have one or more features to allow multiple instances of a bundle in vector mode to be executed in parallel. Such a processor may include a mechanism to replicate an incoming instance of a bundle into one or more other paths. Such a mechanism may operate based on information generated statically by a compiler, information derived dynamically during execution of a program or may operate based on both static and dynamic information.

Such a processor may also include control circuitry that generates control signals to replication circuitry so that only those bundles that can be properly issued in parallel are coupled to multiple paths. In some embodiments, such a processor includes scheduling logic that, based on data dependencies within a bundle and structural limitations of the processor, determines if the bundle can be issued in parallel. For bundles that can be issued in parallel, the scheduling logic may also, based on structural limitations of the processor, determine how many times the bundle can be issued in parallel. Control circuitry may then control coupling circuitry to replicate a bundle in the required number of paths.

Figure 5:
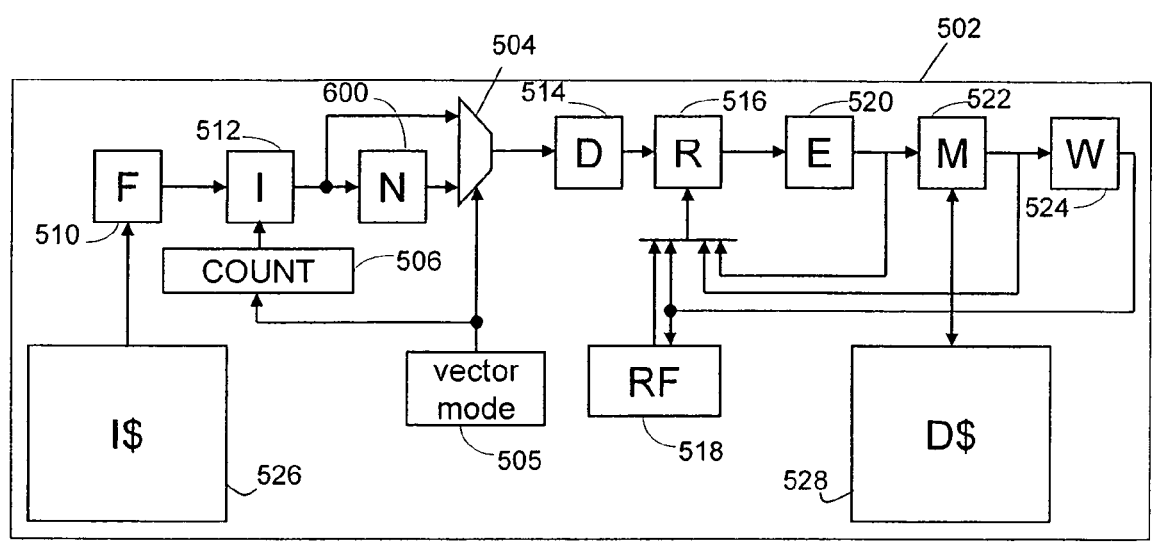
FIG. 5 is a block diagram of a processor according to an embodiment of the invention.

FIG. 5 illustrates a processor 502 according to an embodiment of the invention. Processor 502 may be constructed using conventional processor design and fabrication techniques, though any suitable techniques may be used. In this example, processor 502 is a pipelined processor containing eight pipeline stages. Instructions are provided at one end of the pipeline and processed successively in the stages, causing circuitry in the processor to manipulate data internal or external to the processor or otherwise take action. For simplicity, processor 502 is not shown connected in an overall system, though processor 502 may be connected in any suitable fashion to other components in a computer system or other device. Processor 502 may execute programs quickly and with low power, making it useful in portable electronic devices, but such a processor may be used in any application.

Processor 502 may include multiple components for storing instructions and data. In this example, an instruction cache 526 is shown for storing instructions to be executed by processor 502. Cache 526 may store only a portion of all instructions in a program to be executed by processor 502. Cache 526 may be connected to a larger instruction memory or memories (not shown) to hold the remainder of the instructions in a program executed by processor 502. Cache 526 may contain interface circuitry to move instructions from the larger memories into cache 526 so that the instructions are available for execution. Cache 526 may be a cache as in a conventional processor or may be implemented in any other suitable way.

Processor 502 also may include data cache 528 to store data that is used as an input or generated as an output as instructions are executed. As with instruction cache 526, data cache 528 may include interface circuitry that interfaces data cache 528 to a larger memory or memories and may be implemented as in a conventional processor or in any other suitable way.

Processor 502 also includes a register file 518. Register file 518 includes multiple register locations. In the described embodiment, registers in register file 518 may be used as both vector registers and scalar registers. Register file 518 may be implemented as in a conventional processor or in any other suitable way.

Fetch stage 510 is the first stage of the pipeline. It is connected to instruction cache 526 and fetches instructions from sequential memory addresses unless a branch or other flow altering instruction is executed. Upon execution of a branch or flow altering instruction that specifies a non-sequential address, fetch stage 510 fetches the instruction at the specified address and then resumes fetching instructions sequentially from that point.

Fetch stage 510 may be a fetch stage as in a conventional processor or may be implemented in any other suitable way. For example, fetch stage 510 may allow for operation in either scalar mode or vector mode. In vector mode, instructions may be fetched at a lower rate than in scalar mode. Logic within fetch stage 510 may be modified to accommodate different rates of fetching instructions based on operating mode. Fetch stage 510 may also be constructed to fetch multiple instructions simultaneously to facilitate formation of instruction bundles.

Issue stage 512 is the next stage in the pipeline. Issue stage 512 determines which instruction is passed to subsequent stages for execution. Instruction branching may be implemented at the issue stage. Upon execution of a branch instruction, issue stage 512 may issue a NOP instruction while indicating to fetch stage 510 the address of the next instruction to be fetched. Issue stage 512 may also control the timing at which an instruction is passed to the next stage in the pipeline. Issue stage 512 may be similar to an issue stage in conventional processors.

However, issue stage 512 may be constructed to issue the same instruction multiple times when operating in vector mode. In vector mode, each instruction may be issued for as many instruction cycles as are necessary to execute the instruction the number of times specified by the vector length. Here, counter 506 is shown coupled to issue stage 512. Counter 506 represents hardware that allows issue stage 512 to track the number of iterations of each instruction in order to implement vector runs. Counter 506 may have no effect on the operation of processor 502 in scalar mode. Counter 506 represents schematically that issue stage 512 issues instructions multiple times in vector mode. Such a counter need not be physically present and any other suitable mechanism to generate control signals to issue stage 512 may be used.

Issue stage 512 may also form instructions into bundles, whether based on statically or dynamically generated information. However, any suitable method of forming bundles may be used. In the described embodiment, bundles containing multiple instances of an instruction bundle to replace multiple iterations of an instruction bundle in a vector run are formed in rename stage 600. When bundles are formed by replication of an incoming bundle in rename stage 600, counter 506 may be updated to reduce the number of times issue stage 512 issues the incoming bundle, but any other suitable mechanism to account for parallel execution of iterations of bundles in a vector run may be used.

In a conventional processor, decode stage 514 follows issue stage 512 in the pipeline. As illustrated, rename stage 600 falls between issue stage 512 and decode stage 514 in the pipeline. Rename stage 600 operates in vector mode and may be used to provide renamed addresses to decode stage 514. In the illustrated embodiment, rename stage 600 also may replicate an incoming instruction bundle into one or more other paths for parallel execution of multiple iterations of a bundle in vector mode.

Decode stage 514 follows rename stage 600 in the pipeline. Each instruction may include one or more fields that specify functions to be performed by other components in processor 501. Decode stage 514 converts the values in these fields to control signals appropriate for each component of the processor. For example, the outputs of decode stage 514 control the operation processor 502 to perform an operation as defined by an opcode in an instruction. The outputs of decode stage 514 may also cause data to be read from certain registers for use as operands of the instruction or may cause data to be written to a certain register as the destination of the results of the execution of an instruction. These register locations may be identified from arguments to an instruction being executed. Decode stage 514 may be a decode stage as in a conventional multi-issue processor or may be implemented in any other suitable way.

In scalar mode, rename stage 600 has no effect. Accordingly, processor 502 includes a multiplexer 504 that allows renaming circuit 600 to be bypassed. The control input to multiplexer 504 is derived from vector mode indicator 505, which has a value indicating the operating mode of processor 502. Other components of processor 502 that operate differently in vector and scalar mode also may receive a control signal from vector mode indicator 505.

Read stage 516 may receive register addresses that have been renamed at rename stage 600. However, read stage 516 need not perform differently while in vector mode. It may, in both scalar and vector modes, read the data value stored in register file 518 at the address provided to it or forwarded from further stages in the pipeline.

Execute stage 520 is the next stage in the pipeline. Execute stage 520 executes instructions by sending control signals and data to other components of the processor. Though not expressly shown, those components of processor 502 may be as in a conventional processor or may be implemented in any other suitable way. In the described embodiment, multiple iterations of a bundle are executed in parallel only if the paths of the processor can support multiple instances. Accordingly, no special execution logic is required for a processor to execute multiple instances of a bundle and execute stage 520 may be as in a conventional processor or may be implemented in any other suitable way.

Memory stage 522 is the next stage in the pipeline. Memory stage 522 writes or reads values to or from data cache 528. Write back stage 524 is the final stage in the pipeline. In write back stage 524, results of executing an instruction may be written into register file 518 so that they are available for use in executing a subsequent instruction. The specific register in register file 518 into which the value is written may be as specified in a destination argument to the instruction, or at the destination as renamed in rename stage 600. Alternatively, the results may be passed back directly to the read stage for use at that time.

For simplicity, FIG. 5 does not expressly show all details of a processor 502. For example, it does not show the circuits that may be controlled by executing instructions within the processor. It also does not show power and ground connections or all of the interconnections required to provide control and data signals to each portion of the processor. Details not expressly shown include clock circuitry that produces clock signals that define pipeline cycles during which each stage performs an operation. Latching between stages also is not shown. Similarly, though not expressly shown, status or control signals may pass from one stage to the next to allow each stage to know when to use, or not use, the value latched at the output of the prior stage. Also, there can be conditions under which a stage is not able to read the value from a prior stage in the same cycle that it is available. In this scenario, a control mechanism may be provided to preclude the prior stage from generating a new output value that would overwrite a prior output value until it is used in the subsequent stage. Such control circuitry is said to "stall" stages in the pipeline, meaning that a stage does not provide a new output value during one or more pipeline cycles. One of skill in the art will understand that these and other components may be present to enable processor 502 to perform the desired operations.

Figure 6:
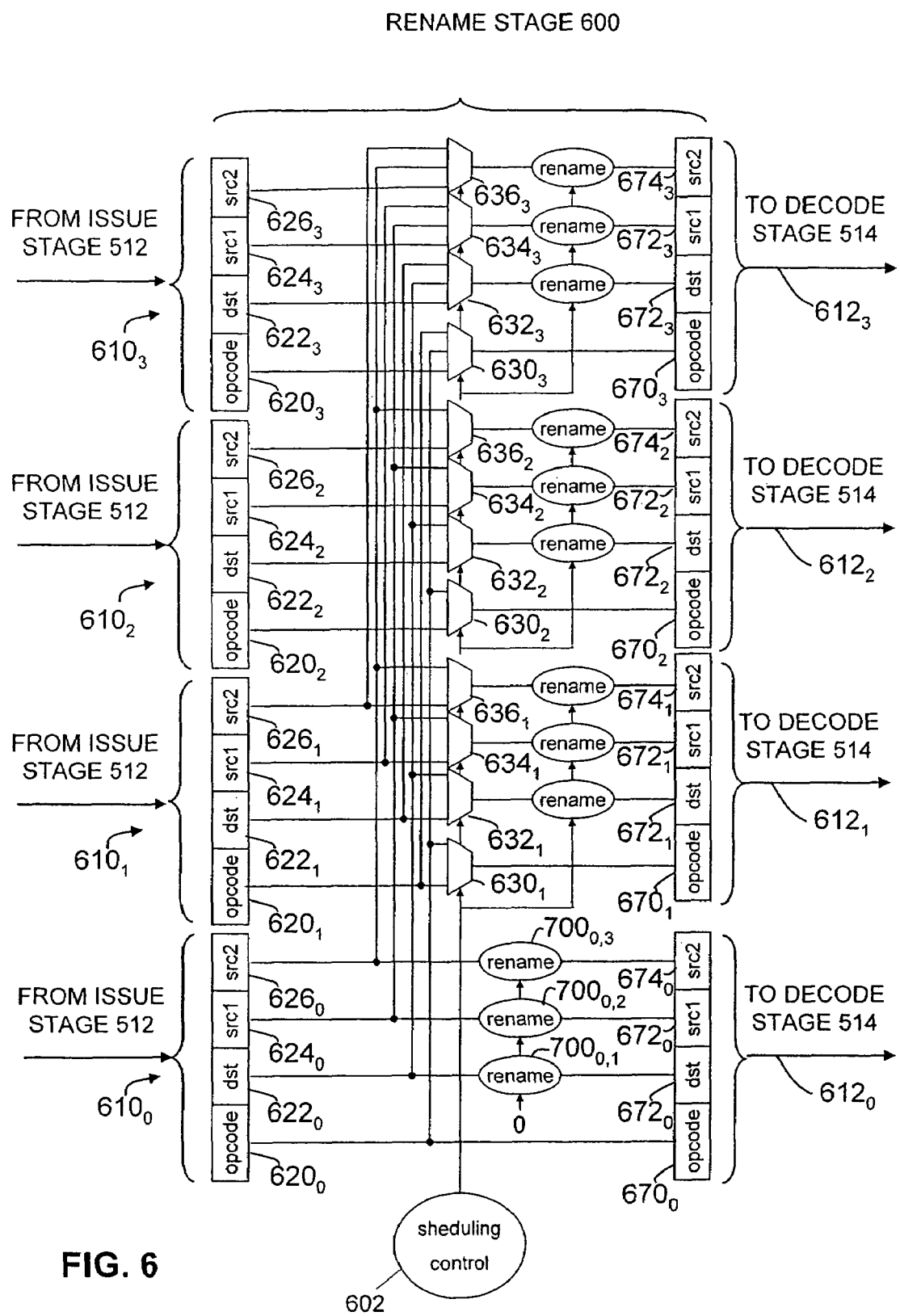
FIG. 6 is a block diagram of an embodiment of a rename stage of the processor of FIG. 5.

FIG. 6 illustrates an embodiment of rename stage 600. In the example of FIG. 6, rename stage 600 can rename arguments in an instruction to ensure that each iteration within a vector run accesses the correct arguments. In addition, rename stage 600 can replicate instances of instructions for parallel execution in multiple lanes of a multi-issue processor. When rename stage 600 replicates an instance of an instruction for parallel execution, it may also rename operands in the replicated instruction.

In the illustrated example, rename stage 600 can receive instructions in up to four incoming lanes, $610_0$, $610_1$, $610_2$ and $610_3$. Each incoming lane is shown to have multiple fields, each corresponding to a field of an instruction. Taking incoming lane $610_0$ as illustrative, an incoming lane includes incoming fields $620_0$, $622_0$, $624_0$, $626_0$. In this example, each incoming field represents a collection of logically related bits. Though, for simplicity of illustration, FIG. 6 shows connections to the fields $620_0$, $622_0$, $624_0$ and $626_0$ as single lines, a physical implementation of rename stage 600 may include multiple conductors, each carrying a bit in each field. The number of bits in each field is not critical to the invention and any suitable number of bits or fields may be conveyed in a path.

In this example, each incoming lane has an opcode field, such as incoming opcode field $620_0$. Each incoming lane also includes an incoming destination field, such as incoming destination field $622_0$. Additionally, each lane may include one or more fields identifying arguments for an instruction. Here two incoming source fields $624_0$ and $626_0$, are shown, carrying operands for an instruction in incoming lane $610_0$.

Instructions in the incoming lanes, suitably replicated and/or renamed, are provided in outgoing lanes $612_0$, $612_1$, $612_2$, and $612_3$. Each outgoing lane includes fields similarly identifying portions of an instruction. Taking outgoing lane $612_0$ as illustrative, the outgoing lane includes outgoing opcode field $670_0$, outgoing destination field $672_0$ and outgoing source fields $674_0$ and $676_0$. The number of bits in each of the fields in the outgoing lane may be the same as the number of the bits in a corresponding field in the incoming lane. However, in an alternative embodiment described below, the number of bits used to represent an argument to an instruction is more in the outgoing lane than the incoming lane. Accordingly, the number of bits and the number of fields in the outgoing lane is not a limitation on the invention and any suitable number of bits and fields may be used.

Rename stage 600 produces values in the fields of the outgoing lanes based on the values in the incoming lanes. The specific values in the outgoing lanes, and the manner in which they are formed within rename stage 600, may depend on the operating mode. In scalar mode, each instruction in an incoming lane $610_0 \ldots 610_3$ may pass through rename stage 600 to a respective outgoing lane $612_0 \ldots 612_3$ without modification.

In vector mode, without parallel execution of iterations of instructions in a vector run, each instruction in an incoming lane $610_0 \ldots 610_3$ may also pass through rename stage 600 to a respective outgoing lane $612_0 \ldots 612_3$. However, values in the incoming source or destination fields that represent vector register addresses may be renamed within rename stage 600. In this mode, the value in each incoming opcode field and those values in the incoming source or destination fields that represent non-vector register addresses may pass through rename stage 600 without modification.

In instructions cycles in vector mode during which multiple iterations of an instruction are to be executed in parallel, rename stage 600 may output two or more instruction instances formed from one incoming instruction. One instance of the instruction may be formed by passing the incoming instruction through rename stage 600 with only vector mode register addresses being renamed as appropriate for vector mode operation. However, one or more of the output lanes may contain a replicated instance of the incoming instruction.

In this example, rename stage 600 includes circuitry to form the replicated instance of an instruction by copying, and in some situations modifying, fields from the incoming instruction. Rename stage 600 may copy the opcode from the incoming instruction. In addition, rename stage 600 may copy without modification arguments of the incoming instruction that are not vector addresses. Rename stage 600 may compute arguments in the replicated instance that are vector register addresses by renaming the vector register addresses in the incoming instruction.

Rename stage 600 may rename vector register addresses in any suitable way. In some embodiments, rename stage 600 renames vectors by indexing incoming vector register addresses in the same way as when multiple iterations of an instruction in a vector run are executed sequentially. The amount that vector register addresses are indexed to form a replicated instance of an instruction depends on the position within the vector run that the replicated instance represents.

For example, if the incoming instruction corresponds to the first iteration of the instruction in a vector run and the replicated instance corresponds to the second iteration of the instruction in a vector run, the vector register addresses in the replicated instance may be computed by indexing the vector register addresses in the incoming instruction by the amount that each vector register address is indexed between iterations of instructions within the vector run. In this example, each vector register address is indexed by one between iterations in a vector run so that rename stage 600 computes vector register addresses in the replicated instance by indexing each vector register address by one. In the same way, if a replicated instance represents an instruction two iterations later in a vector run, the vector addresses in the replicated instance are indexed by two.

Rename stage 600 need not be limited to forming a single replicated instance of a single instruction. In the illustrated embodiment in which four lanes are illustrated, a single incoming instruction could be replicated up to three times such that rename stage 600 outputs four instances of the instruction for parallel execution. Moreover, in some embodiments, instructions may be issued in bundles. Rather than replicating single instructions, rename stage 600 may replicate bundles of instructions.

Rename stage 600 may include circuitry to perform other functions useful in forming instructions for execution in vector mode. For example, it may include circuitry to determine the number of instances of a bundle that may be executed in parallel, track the number of iterations of an instruction that have been executed, and compute register address index values appropriate for each replicated instance of an instruction.

FIG. 6 illustrates one example of circuitry that may be used to perform functions within rename stage 600. Connections between incoming lanes and outgoing lanes are, for at least some of the lanes, switchable. Switchability allows rename stage 600 to function in scalar or vector mode and to form one or more replicated instances of bundles that may have one or more instructions. For each instruction cycle, scheduling and control logic 602 may apply control signals to configure the circuitry for any required operation.

To support scalar mode execution, each lane includes a path that can couple the input to the output. In the first lane, incoming opcode field $620_0$ is connected directly to outgoing opcode field $670_0$. Incoming destination field $622_0$ and incoming source fields $624_0$ and $626_0$ are connected to outgoing destination field $672_0$ and outgoing source fields $674_0$ and $676_0$ through renaming logic $700_{0,1}$, $700_{0,2}$ and $700_{0,3}$, respectively. As described below in connection with FIG. 7, renaming logic, such as $700_{0,1}$, $700_{0,2}$ and $700_{0,3}$, has a vector mode and a scalar mode operation. In scalar mode, an argument passes through renaming logic, such as $700_{0,1}$, $700_{0,2}$ and $700_{0,3}$, without modification.

Each of the other lanes likewise includes circuitry that can pass an incoming instruction without modification. For example, in the second lane, incoming opcode field $620_1$ is connected directly to outgoing opcode field $670_1$ through muliplexer $630_1$. Muliplexer $630_1$ receives a control input from scheduling and control logic 602 that sets muliplexer $630_1$ to pass the value in opcode field $670_1$ when operating in scalar mode. Incoming destination field $622_1$ and incoming source fields $624_1$ and $626_1$ are similarly coupled to outgoing destination field $672_1$ and outgoing source fields $674_1$ and $676_1$ through muliplexers $632_1$, $634_1$, and $636_1$, respectively.

Outputs of multiplexers $632_1$, $634_1$, and $636_1$ are coupled to renaming logic, which may be in the same form as in renaming logic as $700_{0,1}$, $700_{0,2}$ and $700_{0,3}$ in the first lane and may be controlled to pass arguments of an instruction in the second lane without modification.

Each of the other lanes may similarly include multiplexers and renaming circuitry so that, in scalar mode, an instruction applied to any incoming lane may be coupled to a corresponding outgoing lane.

The circuitry illustrated in FIG. 6 also may be controlled to operate in vector mode without replication of incoming instructions. Such a mode may be used, for example, when a bundle issued by issue stage 512 (FIG. 5) is too large for replication in the available lanes or data conflicts or other hardware constraints preclude replication. In vector mode operation without replication, the instruction in each incoming lane is coupled to its corresponding output lane. As in scalar mode operation, the first lane is configured to couple incoming fields $620_0$, $622_0$, $624_0$, $626_0$, to outgoing fields $670_0$, $672_0$, $674_0$, and $676_0$. Each of the other lanes includes multiplexers that can be controlled to couple incoming fields to the outgoing fields. In FIG. 6, such multiplexers are illustrated as muliplexers $630_1$, $632_1$, $634_1$, and $636_1$, muliplexers $630_2$, $632_2$, $634_2$ and $636_2$, and muliplexers $630_3$, $632_3$, $634_3$ and $636_3$. However, when incoming lanes are coupled to outgoing lanes in this fashion, the fields containing arguments of an instruction are coupled through renaming logic, such as $700_{0,1}$, $700_{0,2}$ and $700_{0,3}$.

The circuitry of FIG. 6 also supports vector mode operation in which an incoming bundle is replicated in one or more other lanes. In the illustrated embodiment, an incoming bundle to be replicated has its first instruction in the first lane. To support replication of a bundle with a single instruction, fields of an incoming instruction in the first lane can be coupled into any of the other lanes. To achieve this coupling, muliplexers $630_1$, $630_2$, and $630_3$ each have an input connected to incoming opcode field $620_0$, allowing them to be controlled to couple the incoming opcode from the first lane to any, or all, of the outgoing opcode fields $670_1$, $670_2$ or $670_3$ of the other lanes.

To provide a destination argument for each replicated instance, multiplexers $632_1$, $632_2$, and $632_3$ have an input coupled to incoming destination field $622_0$, allowing them to be controlled to couple the incoming destination argument from the first lane to any, or all, of the other lanes. Each of the multiplexers $632_1$, $632_2$, and $632_3$ has its output coupled to renaming logic, which allows the destination argument to be renamed as appropriate for the iteration of the instruction being replicated.

To provide source arguments for each replicated instance, multiplexers $634_1$, and $636_1$, $634_2$ and $636_2$, and, $634_3$ and $636_3$ each have an input coupled to an incoming source field $624_0$ or $626_0$, allowing them to be controlled to couple the incoming source arguments from the first lane to any, or all, of the other lanes. Each of the multiplexers $634_1$, and $636_1$, $634_2$ and $636_2$, and, $634_3$ and $636_3$ has its output coupled to renaming logic, which allows the source arguments to be renamed as appropriate for the iteration of the instruction being replicated.

If an incoming bundle to be replicated has more than one instruction, a second instruction of the incoming bundle will, for operation with the embodiment of rename stage 600 pictured in FIG. 6, appear in the second lane and be replicated into the fourth lane. Accordingly, multiplexers $630_3$, $632_3$, $634_3$ and $636_3$ each have an input coupled to a corresponding incoming field $620_1$, $622_1$, $624_1$, or $626_1$. Each of multiplexes $632_3$, $643_3$ and $636_3$ has its output coupled to renaming logic, which allows arguments to be renamed as appropriate.

As described above, rename stage 600 includes multiple copies of renaming logic to support renaming of arguments in vector mode. An example embodiment of such renaming logic is provided in FIG. 7. Renaming logic 700 may be replicated for each register field of each instruction issued in parallel. In the example of FIG. 6, renaming logic 700 is replicated twelve times (4 instructions with 3 register fields each).

Figure 7:
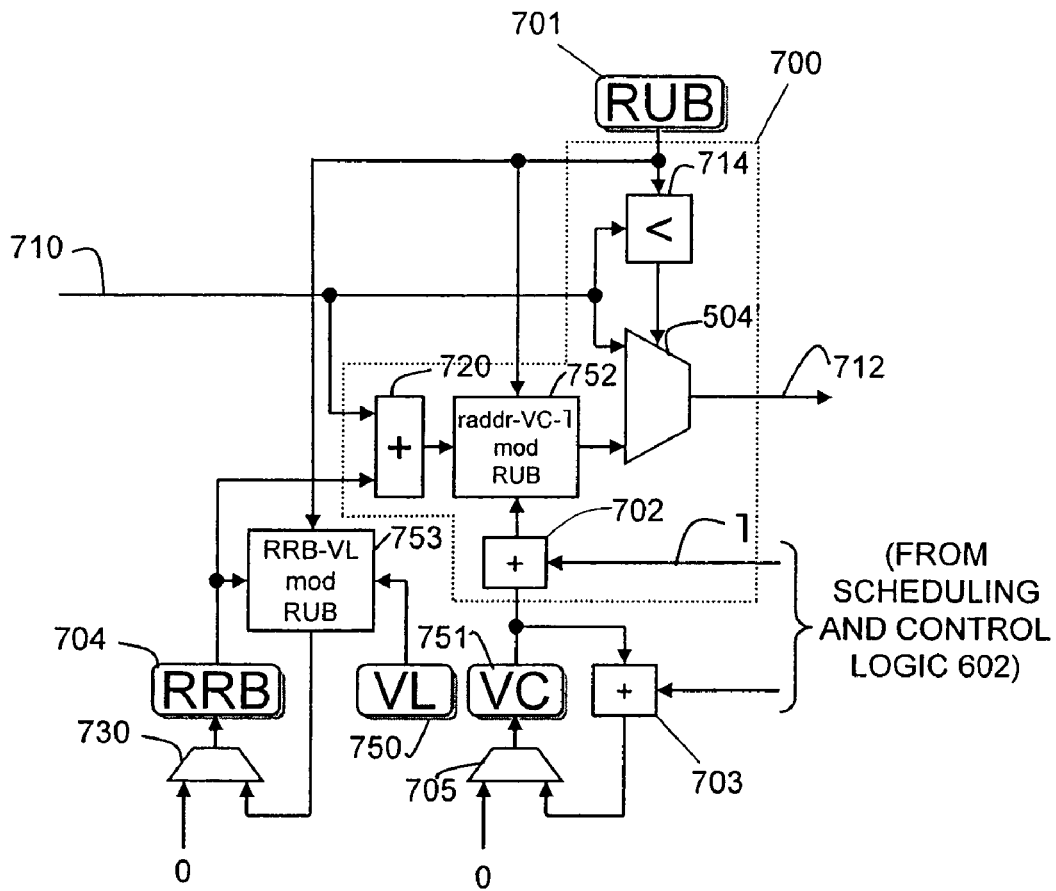
FIG. 7 is a sketch of an embodiment of renaming logic in the rename stage of FIG. 6.

FIG. 7 shows renaming logic 700 and a portion of scheduling and control logic 602. Input 710 is processed within renaming logic 700 to provide an output 712 which, depending on operating mode, may be a renamed register address computed based on the input 710.

If input 710 does not represent a vector register address to be renamed, multiplexer 504' may be controlled to pass input 710 to output 712 without modification. As described above, input 710 is not renamed in scalar mode. FIG. 5 illustrates a multiplexer 504 that bypasses renaming logic 503 for scalar mode execution. In some embodiments, multiplexer 504' could be a portion of a distributed implementation of multiplexer 504. However, in an embodiment with a multiplexer 504 implemented as pictured in FIG. 5, renaming logic 700 will be bypassed in scalar mode and renaming logic 700 does not require a scalar mode of operation.

When input 710 represents a vector register address to be renamed, renaming logic 700 computes a renamed register address based on values of certain parameters, which may be stored in registers. Register RUB 701 is set by a SVMODE instruction and is used to determine if, when the processor is in vector mode, a register address at input 710 is a vector register address or a scalar register address, which is not renamed. In the illustrated embodiment, a register address that is strictly lower than the contents of RUB indicates a vector register and is renamed. In the example code of FIG. 1, RUB is set to 30 by the second immediate field of SVMODE instruction 162.

VL register 750 holds the vector length and is set by an SVMODE instruction or in any other suitable way. RRB register 704 holds the value of a renaming base, and may be set arbitrarily to 0 when an SVMODE instruction is executed. The value of RRB is decremented modulo RUB by the vector length VL each time the end of loop branch is taken.

VC register 751 holds the current vector count, representing the number of instances of an instruction bundle that already have been output by rename stage 600 for execution. The value in VC register 751 is set to 0 when a new bundle is issued in vector mode, and is incremented each instruction cycle by the number of instances of that bundle replicated plus one. In the example of a four lane processor, VC can be incremented each instruction cycle by 1 (no replication), by 2 (duplication), by 3 (2×replication), or by 4 (3×replication).

Accordingly, renaming logic 700 computes a renamed address using the following renaming formula:

$$Ren(A) = (A + RRB - (VC + ])) \bmod RUB$$

This function may be implemented with circuitry having the following operation: an incoming register address A is first added to the renaming base RRB. From this result is removed (modulo RUB) the current vector count, itself incremented by a value ] determined by control logic 602. This incremental value ] is used to adjust VC to each lane when bundles are replicated, and is a function of the lane position, the incoming bundle size and the number of times a bundle is replicated. For the example of FIG. 6, in lane 0, the increment is always 0, as indicated in FIG. 6. In lane 1, this value is either 0 (no replication or bundle size is at least 2) or 1 (replication and bundle size is 1). In lane 2, this value is either 0 (no replication), 1 (replication and bundle size is 2) or 2 (replication and bundle size is 1), and in lane 3, this value is either 0 (no replication), 1 (replication and bundle size is 2) or 3 (replication and bundle size is 1).

The circuitry illustrated in FIG. 7 provides one example of circuitry that can compute the desired renaming formula. Multiplexer 504' is controlled to pass the value at input 710 to output 712 if the value at the input does not represent a vector register address, which in the illustrated embodiment is any register address greater than or equal to RUB. For inputs representing register addresses less than RUB, multiplexer 504' passes to output 712 a renamed register address computed within renaming logic 700. In the embodiment shown, comparator 714 compares an incoming register address to the value stored in RUB register 701 and provides a control input to multiplexer 504' so that multiplexer 504' passes without modification any address that is not a vector register.

Renaming logic 700 includes subtractor 752. Subtractor 752 is a modulo subtractor with a modulus equal to the value RUB stored in register 701. Modulo subtractor 752 produces a value between 0 and RUB-1, ensuring that any address computed points to a register within a portion of register file 518 allocated for holding vector registers.

One operand to subtractor 752 comes from adder 720. A second operand to subtractor 752 is derived from the value VC stored in vector count register 751. To implement the formula described above, before the value of VC is applied to subtractor 752, it is offset by the value ], as described above. The value of ] is provided by scheduling and control logic 602 to ensure that the appropriate value is provided in each lane for the operation being performed.

The value of VC, appropriately offset by the value of ], is subtracted from the value from adder 720. As the value of VC increases, the output of subtractor 752 decreases, thereby indexing the register address to decrease for each iteration of an instruction within a vector run.

So that VC register 751 can contain a count of the number of iterations of a bundle that have been processed, adder 703 increases the value in VC register 751 by the number of iterations of a bundle being processed in the current instruction cycle. This number is provided by scheduling and control logic 602. The output of adder 703 can be loaded into VC register 751 through multiplexer 705 for each instruction cycle within a vector run. Multiplexer 705 has a second input hardwired to 0, which allows the value in VC register 751 to be reset at the start of each vector run.

Because, in the pictured embodiment, the value of VC in register 751 is reset to zero at the start of each vector run, additional circuitry is used to ensure that the pattern of indexing does not result in different register addresses being renamed to the same address if there are multiple vector runs within a loop. At the start of each vector run, a value denoted RRB is determined. The amount that each register address is indexed is adjusted by the value of RRB.

In the embodiment of FIG. 7, RRB is stored in register 704. Register 704 is loaded, at the start of each vector run, with a value from multiplexer 730. In the embodiment illustrated, multiplexer 730 has one of its switched inputs hardwired to 0. At the start of the first vector run of a loop, multiplexer 730 couples this input to register 704. In this way, the value RRB in register 704 is set to zero at the start of the execution of a loop in vector mode. In one embodiment, the start of a loop is indicated by the execution of an SVMODE instruction 162 (FIG. 1B). In this embodiment, each loop executed in vector mode is preceded by an SVMODE instruction 162. However, any suitable method for determining the start of a loop in vector mode may be employed.

When the branch at the end of the loop is taken, register 704 loads a value from multiplexer 730, which is derived from the other switched input of multiplexer 730. Here, the other switched input is the output of subtractor 753.

Subtractor 753 is a modulo subtractor, operating modulo RUB. It outputs a result that is the value of RRB, as stored in register 704, decreased by the vector length stored in register 750. This value is computed with a modulus of RUB.

The output of subtractor 753 may be taken as a negative value. When the value computed in subtractor 753 is added in adder 720 to the incoming register address, the result represents the input register address reduced by the vector length for each vector run that has been completed. When the value VC is then subtracted from the value output by adder 720, the result is a register address that is indexed an amount based on the number of iterations that have been performed of the instruction that uses that register for vector variable storage.

As described above, scheduling and control logic 602 determines the number of bundles to be processed in parallel and generates control signals for components within rename stage 600 to perform the desired operations. Scheduling and control 602 may be implemented in an suitable way, such as in a microcontroller cell, state machine or other circuit configuration that executes a suitable scheduling and control algorithm. An example embodiment of an algorithm that scheduling and control logic 602 may execute is pictured in FIG. 8.

FIG. 8 illustrates a pseudo-code representation of an algorithm that may be implemented in control logic block. 602. The variable IncomingBundle holds the list of instructions coming from issue stage 512 (line 1). In line 2, the number of times IncomingBundle can be replicated, ReplicateCount, is determined based on its size |IncomingBundle|, and the issue width of the processor, ProcessorIssueWidth. The replicate count can be further reduced by the structural limitations of the processor. This is determined in the loop starting at line 3. For each instruction type instType present in IncomingBundle, a determination is made of whether there are structural limitations for this type of instruction in line 4. This is done by dividing the number of resources of this type in the processor by the number of instructions of this type in IncomingBundle. If the result r is lower than ReplicateCount, ReplicateCount is set to r, as shown in line 5.

The rest of the algorithm builds and issues a number of OutgoingBundle's by concatenating IncomingBundle up to VL times, all the while respecting data dependences. In line 6, VC, the vector count register, is set to 0 and in line 7, the variable IssueCount is set to VL. This variable keeps count of how many times IncomingBundle is issued. The vector loop starts in line 8 and one iteration is executed for each processor clock cycle.

For each iteration of the loop starting line 8, OutgoingBundle is initialized to an empty list in line 9. In line 10, this iteration's replication count N is set tentatively to the minimum of IssueCount and ReplicateCount; this ensures that no more than VL instances of IncomingBundle are issued. In line 11 to 12, OutgoingBundle is built by concatenation and renaming of N instances of IncomingBundle. The renaming is performed as described above as a function of RRB, VL, VC and the lane number (determined from the bundle size and loop variable i).

The concatenation and renaming may expose data dependences that prevent the parallel execution of several instances of IncomingBundle. This is checked by a loop described in lines 13 to 16. For each instruction inst in OutgoingBundle, the destination register of the instruction, dst(inst), is compared to all the source operand registers present in all the instructions comprising OutgoingBundle, src(OutgoingBundle), and if there is at least a match, then IncomingBundle cannot be replicated and the concatenation is rolled back; OutgoingBundle is simply set to IncomingBundle (line 15) and N is set to 1 (line 16).

In line 17, VC is incremented by N, indicating that N elements of the vector operation are issued in this cycle. In line 18, IssueCount is decremented by N, keeping track of how many vector elements remain to be issued. The resulting bundle OutgoingBundle is issued to the next stage of the pipeline in line 19. The loop then moves on to the next processor cycle (line 20) and iterates again if IssueCount is not null (line 21). If VL instances of IncomingBundle were issued, the process loops back to line 1 (line 22), where a new IncomingBundle is read from the preceding pipeline stage.

Figure 9:
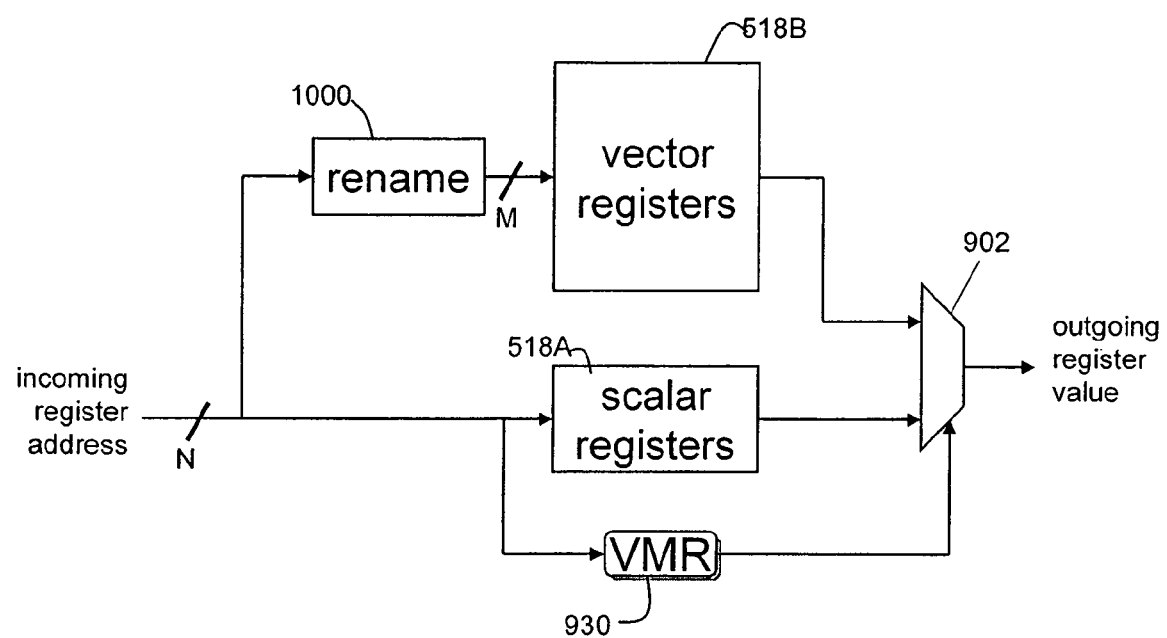
FIG. 9 is a sketch of an alternative embodiment of a portion of a processor according to an embodiment of the invention.

Turning to FIG. 9, an alternative embodiment of renaming portions of a processor according to an embodiment of the invention. FIG. 9 illustrates an embodiment in which vector registers are not implemented as part of the processor's original architectural register file 518A. Rather, vector registers may be implemented in a separate register bank 518B. Register bank 518B may be dedicated to storing vectors, but may in some embodiments store other values in other modes of operation.

Using a separate register bank 518B can increase the number of registers available for vector storage, which allows each vector run to be longer. As a result, a processor may execute a program faster and with lower power dissipation (longer vectors reduce accesses to the instruction cache, which consumes power).

The size of register bank 518B is arbitrary and can be larger than the processor's original architectural register file size. Although the instruction format remains unchanged, an adequate renaming mechanism, such as the one described in FIG. 10 below, can be used to generate addresses to any register within register bank 518B, even if the number of registers in the vector bank is larger than what can be addressed within the limitations of the instruction format.

For example, each of the incoming source or destination fields, such as $622_0$, $624_0$ or $626_0$, may contain N bits, allowing each field to represent a maximum of $2^N$ unique addresses. Because renaming involves mapping a vector register addresses to a new register address for each iteration of an instruction in a vector run, the addresses that are the targets of such a mapping may have more than N bits. As shown, register bank 518B is addressed by M bits, allowing register bank 518B to have as many as $2^M$ registers, with M>N.

Other modifications may be made for embodiments in which a separate register bank 518B is provided. Accessing a larger register file bank may impact the processor's cycle time and a processor using such a register bank may have an added pipeline stage that is used in vector mode.

Also, instructions may be provided to copy data between architectural register file 518A and register bank 518B. Such instructions may be used before a loop to copy initialized vector element values from architectural register file 518A to register bank 518B. After a loop, similar instructions may be used to copy vector elements that are still live (i.e., will be used in the code following the loop) from register bank 518B to architectural register file 518A.

The representation of FIG. 9 is simplified. For example, various elements depicted in FIG. 9 may actually be located in different pipeline stages of the processor. For example, referring to FIG. 5, the rename logic may be in rename stage 600 while accesses to the registers may take place in read stage 516. FIG. 9 also illustrates only a read access. A write access would be similar, differing in the fact that instead of a value being read out of one of the register banks, a value would be written into one of the register banks. Addressing and renaming could be the same in both cases.

In FIG. 9, a register address coming from an instruction is directed to the scalar register file bank 518A, to a renaming logic block 1000 and to a Vector Mask Register (VMR) 930. The scalar register file bank 518A and the VMR 930 are accessed at the register address, while the vector register file bank 518B is accessed at a renamed address generated by renaming logic 1000. The one bit value returned by VMR 930 is used to control multiplexer 902, and selects which value, scalar or vector, is forwarded to the rest of the processor's pipeline.

In the renaming scheme depicted in FIG. 9, the RUB architectural register 701 described in FIG. 7 is not used. The RUB value separated the processor's original architectural register file into a vector storage region and a scalar storage region. Instead, it is replaced by a VMR 930, which stores information on which registers are vectors and which are scalar. Like RUB register 701, VMR may be set with a SVMODE instruction.

Figure 10:
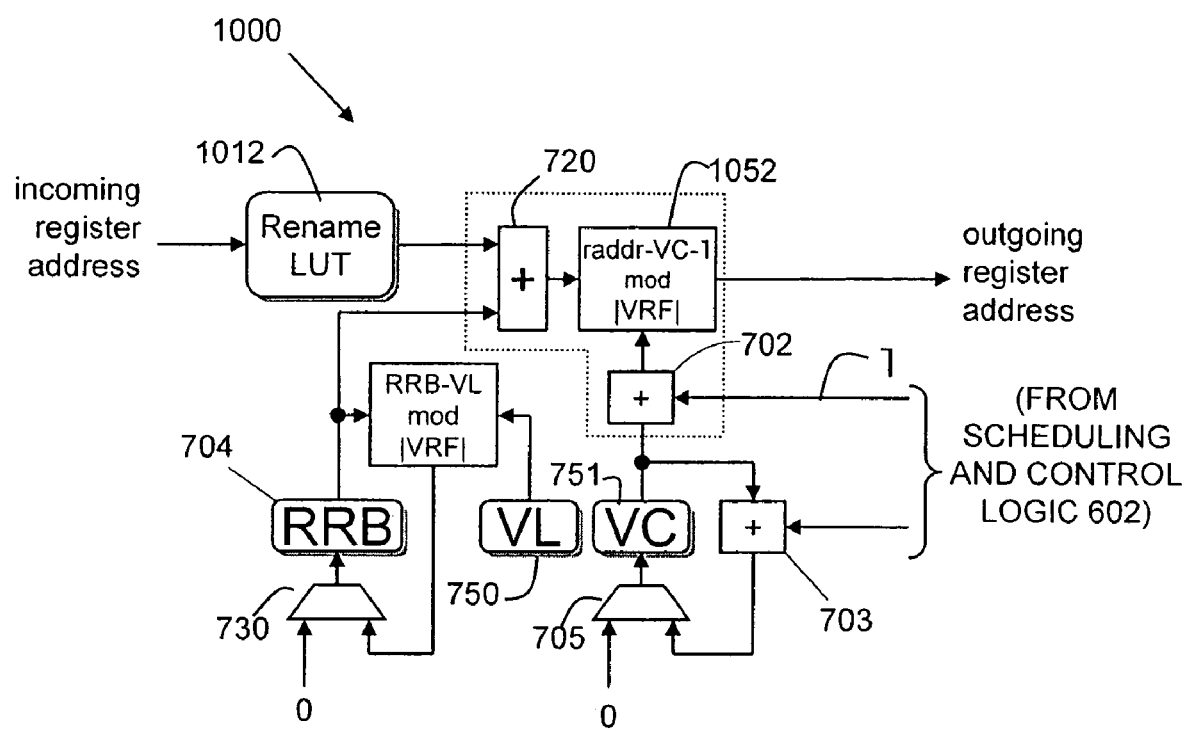
FIG. 10 is a sketch of an alternative embodiment of renaming logic that may be used in the circuit of FIG. 9.
Figure 7:
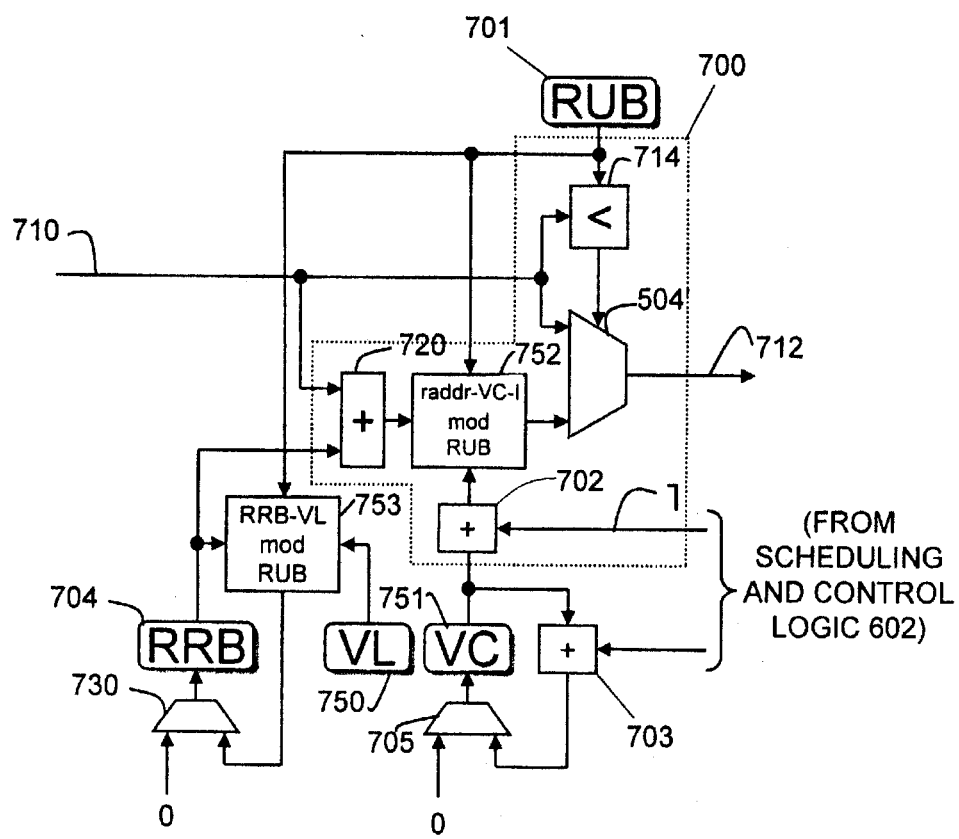
Figure 10:
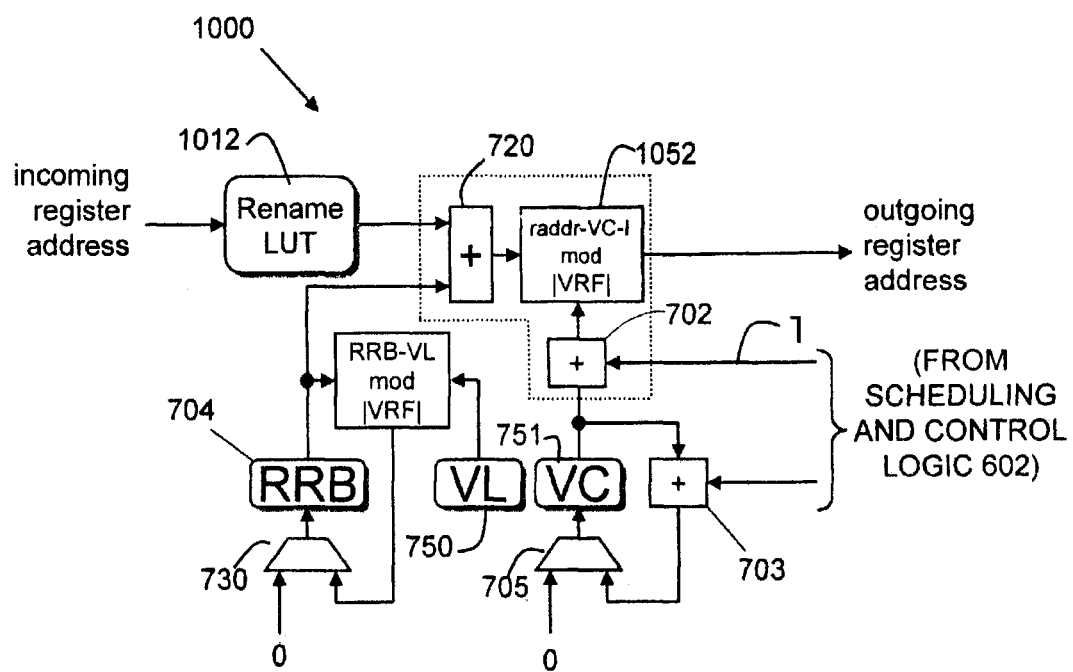

An embodiment of renaming logic 1000 is shown in FIG. 10. Renaming logic 1000 operates according to a renaming formula as follows:

$$Ren(A) = (RenameLUT(A) + RRB - (VC+]))\bmod |VRF|$$

RenameLUT is a mapping function that translates an incoming register address A into a translated address RenameLUT(A). In a physical implementation of renaming logic 1000, such a mapping may be implemented in a memory acting as a look-up table 1012. The size of such a memory may be small. For example, for a processor with 16 architectural registers and 32 vector registers, its size would be:

$$16 \times \log_2(32) = 80 \text{ bits}.$$

Look up table 1012 may be initialized before a loop. Initialization may be performed by code inserted by a compiler automatically, but any suitable method of creating a look up table may be used.

The RenameLUT may be treated as part of the architectural state of the processor.

In the formula above, |VRF| represents the size of the register bank 518B. The size of register bank 518B may be a power of 2, and the modulo operation in which it is involved would therefore be simplified.

By using LUT 1012 in a processor, a compiler's work for allocating vector registers while compiling a program to run on that processor is also simplified. For example, vector registers do not need to be allocated contiguously.

Other portions of renaming logic 1000 may be similar to renaming logic 700, as described above. Though no register corresponding to RUB register 701 is required, RRB register 704, VL register 750 and VC register 751 may be included in renaming logic 1000. Similarly, multiplexers 705 and 730 may be included, along with adders 702 and 703.

Subtractors 1052 and 1053 may be included, performing functions similar to those performed by subtractors 752 and 753 (FIG. 7), though modified to reflect the renaming formula used in renaming logic 1000.

As an example of the operation of renaming logic 1012, a processor's architecture may define 16 scalar registers and 32 vector registers. For a particular vector loop a compiler may identify registers R2, R3, R6, R7 and R10 as vector registers and determine that the optimal vector length is 7.

Additionally, the compiler may identify R2 and R3 as holding two successive values of the same variable (such as registers R2 and R3 in the code example of FIG. 1). Such a variable is live across iterations of the loop and therefore may use two registers holding successive values, whose live-ranges overlap, to execute correctly in vector mode.

Upon execution of such a program in vector mode, the RenameLUT could be initialized, for example, such that R2 is translated into V6, R3 into V7, R6 into R14, R7 into V21 and R10 into V28. When the loop code is executed, if registers R2, R3, R6, R7 or R10 appear in the code, they are identified as vector registers by VMR, they are renamed and the vector register bank is accessed rather than the scalar register bank. In effect registers R2, R3, R6, R7 and R10 in the scalar register bank are not used.

During the first vector (or mine striping) run, assuming that RRB holds 0, register R2 will be renamed in succession to V6, V5, ... V0; register R3 to V7, V6, ..., V1; register R6 to V14, V13, ..., V8; register R7 to V21, V20, ..., V15; and register R10 to V28, V27, ..., V22. Registers V29 to V31 are not used. Thus in vector mode, 28 vector registers (V0 to V28) are used, even though the instruction format can only specify 16 registers.

At the first taken end of loop branch, RRB will be updated to:

$$(RRB-VL) \bmod |VRF| = (0-7) \bmod 32 = 25$$

and during the second vector strip register R2 will be renamed to V31, V30, ..., V25; R3 to V0, V31, ..., V26; (note the wrap around due to the modulo renaming). Execution will continue in this fashion until the vector loop is completed.

This invention is not limited in its application to the details of construction and the arrangement of components set forth in the above description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art.

For example, scheduling control logic 602 could be constructed to increase the scenarios in which bundles of vector mode instructions may be executed in parallel. For example, in the example of FIG. 4, bundles $150_{2A}$ and $150_{2B}$ could be issued in parallel without violating the structural constraints of the processor. In the embodiment illustrated, these bundles are not issued in parallel because of a data dependence that exists between successive instances of the first instruction in the bundle. Specifically, the value in r16 is modified in the first instance and then read in the second instance. This dependence could be removed if the second instance of this instruction were changed from "r15=r16+1" to "r15=r17+2". In this example, the value of the operand creating the data dependency increases by one for each iteration. This pattern allows the value of the operand in any iteration to be determined, without regard to the value at the end of the immediately prior iteration. For bundles that could otherwise be issued in parallel without violating structural limitations of a processor executing them, scheduling control logic 602 could be constructed to detect such patterns and modify instances of the instruction to remove the dependence.

As another example, each instance of renaming logic 700 was shown to be identical. However, it is not necessary that all instances be the same. For example, adder 702 may be omitted for those instances of renaming logic 700 in lane 0 because, for those instances one input to adder 702 will be 0. Likewise, adder 703 could be provided in only one instance of renaming logic 601 in each lane. Any other suitable optimizations could be made, but these and other variations are not depicted in FIG. 7 for simplicity.

Moreover, FIG. 5 shows that the replication of bundles and the renaming of register are affected in a separate rename pipeline stage. However, in some embodiments, these functions may not be grouped in a single stage or may not be performed in a dedicated stage. As an example of an alternative implementation, the replication of bundles may be performed in the issue stage where bundles are formed in the first place, and the renaming may take place in the decode stage.

Also, the invention is illustrated by a processor in which bundles contain a plurality of instructions, the invention is not limited in that regard and could be implemented on programs with a single instruction per bundle.

As another example, FIG. 9 illustrates a separate register bank 518B used only in vector mode. Such an implementation is not a requirement of the invention and the registers in register bank 518B may be used for any suitable purpose is scalar mode execution such as multi-threaded execution, where several programs run simultaneously on the processor, sharing the execution units of the processor, but each program requiring its own register file.

Additionally, FIG. 9 illustrates that register bank 518B used in vector mode is completely separate from architectural register file 518A. Such an implementation is also not a requirement of the invention. Register bank 518B could be implemented using registers in architectural register file with additional registers for vector mode execution.

Such alterations, modifications, and improvements are intended to be part of this disclosure, and are intended to be within the spirit and scope of the invention. Accordingly, the foregoing description and drawings are by way of example only.

What is claimed is:

1. A processor adapted to execute a plurality of instances of an instruction, the instruction comprising an opcode and at least one argument, the processor comprising:
   a) a plurality of lanes, each lane adapted to execute an instruction;
   b) coupling circuitry adapted to couple at least one incoming lane of the plurality of lanes to a respective at least one coupled lane of the plurality of lanes in response to a control signal, the coupling circuitry comprising for each respective coupled lane:
      i) at least one opcode switching element, each opcode switching element connected between the at least one incoming lane and the respective coupled lane, the opcode switching element adapted to couple the opcode of an instruction in the at least one incoming lane to the at least one respective coupled lane, whereby instances of the instruction are executed in the at least one incoming lane and the at least one coupled lane, respectively; and
      ii) at least one argument switching element, each argument switching element connected between the at least one incoming lane and the respective coupled lane, the argument switching element adapted to selectively modify an address of at least one argument of an instruction in the at least one incoming lane and couple the at least one modified address to the respective coupled lane; and c) control circuitry adapted to control the opcode switching element and the argument switching element.

2. The processor of claim 1, wherein the coupling circuitry is adapted to couple a first of the lanes to each other lane of the plurality of lanes.

3. The processor of claim 1, additionally comprising a register bank comprising a plurality of registers each identified by a register address, wherein the coupling circuitry is adapted to modify an address of an argument for an instruction by computing a modified register address from a register address in the instruction.

4. The processor of claim 3, wherein each of the at least one argument switching elements comprises at least one rename circuit, the rename circuit having a signal input, a control input and an output and being adapted to provide a modified register address at the output in response to a register address at the signal input and a value at the control input.

5. The processor of claim 4, wherein each of the at least one rename circuits comprises a first rename circuit adapted to rename a first operand of an instruction, a second rename circuit adapted to rename a second operand of the instruction and a third rename circuit adapted to rename a destination of the instruction.

6. The processor of claim 1, wherein the processor operates in a vector mode in which a vector length is specified and the control circuitry is adapted to dynamically generate control signals to control the coupling circuitry based on the vector length when the processor is operating in vector mode.

7. The processor of claim 1, wherein:

the processor is selectively operable in vector mode, the address of the at least one argument is a register address; and the processor further comprises:

a first register bank comprising a first plurality of registers;

a second register bank comprising a second plurality of registers; and the at least one coupled lane comprises at least one register access circuit adapted to access a register in the first register bank in response to the address of the at least one argument when the processor is operating in vector mode and to access a register in the second register bank in response to the argument when the processor is not operating in vector mode.

8. The processor claim 7, wherein the first plurality is more than the second plurality.

9. The processor of claim 7, wherein the register address is N bits and the first register bank comprises more than $2^N$ registers.

10. The processor of claim 7, wherein a plurality of instances are executed for each instruction in vector mode and the register access circuit comprises at least one rename circuit adapted to compute a register address in the first register bank for each instance.

11. A processor adapted to execute a plurality of instances of an instruction, the instruction comprising an opcode and at least one argument, the processor comprising:

a) a first plurality of lanes, each lane adapted to execute an instruction;

b) coupling circuitry adapted to copy an instruction in an incoming lane of the first plurality of lanes into a second plurality of coupled lanes of the first plurality of lanes in response to a control signal, the coupling circuitry for each respective coupled lane comprising:

i) an opcode switching element, each opcode switching element connected between the incoming lane and the respective coupled lane, the opcode switching element adapted to couple the opcode of an instruction in the at least one incoming lane to the at least one respective coupled lane; and ii) an argument renaming element, the argument renaming element connected between the incoming lane and the respective coupled lane, the argument renaming element adapted to selectively modify an address of an argument of an instruction in the incoming lane and couple the modified address to the respective coupled lane, wherein the modified address of the argument in each of the second plurality of coupled lanes is different; and c) control circuitry adapted to control the opcode switching element and the argument renaming element.

12. The processor of claim 11, wherein the control circuitry is adapted to select a number of coupled lanes in the second plurality based on a value specifying a number of iterations of the instruction.

13. The processor of claim 12, wherein the first plurality of lanes is four lanes and the second plurality of instructions is three lanes.

* * * * *

UNITED STATES PATENT AND TRADEMARK OFFICE
CERTIFICATE OF CORRECTION

PATENT NO.         : 7,493,475 B2
APPLICATION NO.    : 11/602277
DATED              : February 17, 2009
INVENTOR(S)        : Osvaldo M. Colavin It is certified that error appears in the above-identified patent and that said Letters Patent is hereby corrected as shown below:

Attached FIG. 7 replaces FIG. 7 as originally filed.

Attached FIG. 10 replaces FIG. 10 as originally filed.

Col. 16, line 57 should read:
Ren(A) = (A + RRB − (VC+I)) mod RUB

Col. 16, lines 62 and 63 should read:
mented by a value I determined by control logic 602. This incremental value I is used to adjust VC to each lane when Column 17, line 34 should read:
The value of VC, appropriately offset by the value of I, is Column 20, line 28 should read:
Ren(A) = (RenameLUT(A) + RRB − (VC+I)) mod |VRF|

Signed and Sealed this
First Day of January, 2013

David J. Kappos
*Director of the United States Patent and Trademark Office*